US012570093B2

(12) United States Patent
Efendi et al.

(10) Patent No.: US 12,570,093 B2
(45) Date of Patent: Mar. 10, 2026

(54) DIGITAL-TO-GARMENT INKJET PRINTING MACHINE

(71) Applicant: M&R Printing Equipment, Inc., Roselle, IL (US)

(72) Inventors: Tolga Efendi, Roselle, IL (US); Piotr Latka, Roselle, IL (US); Stephen Chuddy, Roselle, IL (US)

(73) Assignee: M&R Printing Equipment, Inc., Roselle, IL (US)

( * ) Notice: Subject to any disclaimer, the term of this patent is extended or adjusted under 35 U.S.C. 154(b) by 176 days.

(21) Appl. No.: 18/473,537

(22) Filed: Sep. 25, 2023

(65) Prior Publication Data

US 2024/0083179 A1 Mar. 14, 2024

Related U.S. Application Data

(63) Continuation of application No. 17/360,752, filed on Jun. 28, 2021, now Pat. No. 11,801,690, which is a continuation of application No. 16/657,744, filed on Oct. 18, 2019, now Pat. No. 11,077,676.

(51) Int. Cl.

| | |
|---|---|
| ***B41J 3/407*** | (2006.01) |
| ***B41J 2/21*** | (2006.01) |
| ***B41J 11/00*** | (2006.01) |
| ***D06P 5/30*** | (2006.01) |

(52) U.S. Cl.
CPC ........... *B41J 3/4078* (2013.01); *B41J 2/2117* (2013.01); *B41J 11/002* (2013.01); *D06P 5/30* (2013.01)

(58) Field of Classification Search
CPC ...... B41J 3/4078; B41J 2/2117; B41J 11/002; B41J 15/06; D06P 5/30
See application file for complete search history.

(56) References Cited

U.S. PATENT DOCUMENTS 5,782,184 A * 7/1998 Albertalli ............... B41J 2/1632 400/120.16
2003/0090536 A1* 5/2003 Sloan, Jr. ............... B41J 2/1752 347/22
2003/0142168 A1* 7/2003 Suzuki ................. B41J 11/0015 347/43
2007/0068403 A1* 3/2007 Fresener .............. B41J 3/40731 101/115
2008/0238999 A1* 10/2008 Silverbrook ......... B41J 11/0024 347/42
2014/0289974 A1* 10/2014 Okada ..................... D06P 5/155 8/457

(Continued)

*Primary Examiner* — Jason S Uhlenhake
(74) *Attorney, Agent, or Firm* — Richard C. Himelhoch; UB Greensfelder LLP

(57) ABSTRACT

Disclosed is a carriage for a direct to garment inkjet printing machine. The machine has a frame having a leading edge, a trailing edge, and a pair of opposed lateral edges. A first row of slots is positioned on the leading edge and a second row of slots is positioned on the trailing edge. The second row of slots is spaced from the first row of slots by a gelling gap. A shelf on the frame supports tanks of white ink and tanks of color ink and a first plurality of tubing connects a tank of white ink positioned on the shelf with a print head in the first row of slots. A second plurality of tubing is for connecting a tank of color ink positioned on the shelf with a print head in the second row of slots. A pair of side heaters attached to opposed lateral edges of the first frame.

20 Claims, 12 Drawing Sheets

(56) References Cited

U.S. PATENT DOCUMENTS

| | | | | |
|---|---|---|---|---|
| 2015/0259784 | A1* | 9/2015 | Goto | B41J 2/04581<br>427/8 |
| 2018/0370253 | A1* | 12/2018 | Ohnishi | C09D 11/326 |

* cited by examiner

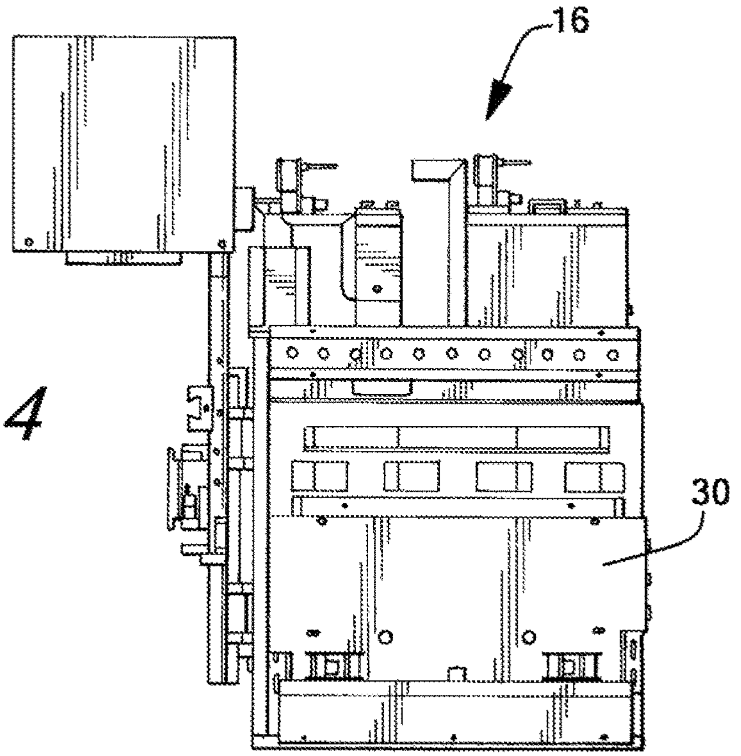
FIG. 4
FIG. 5
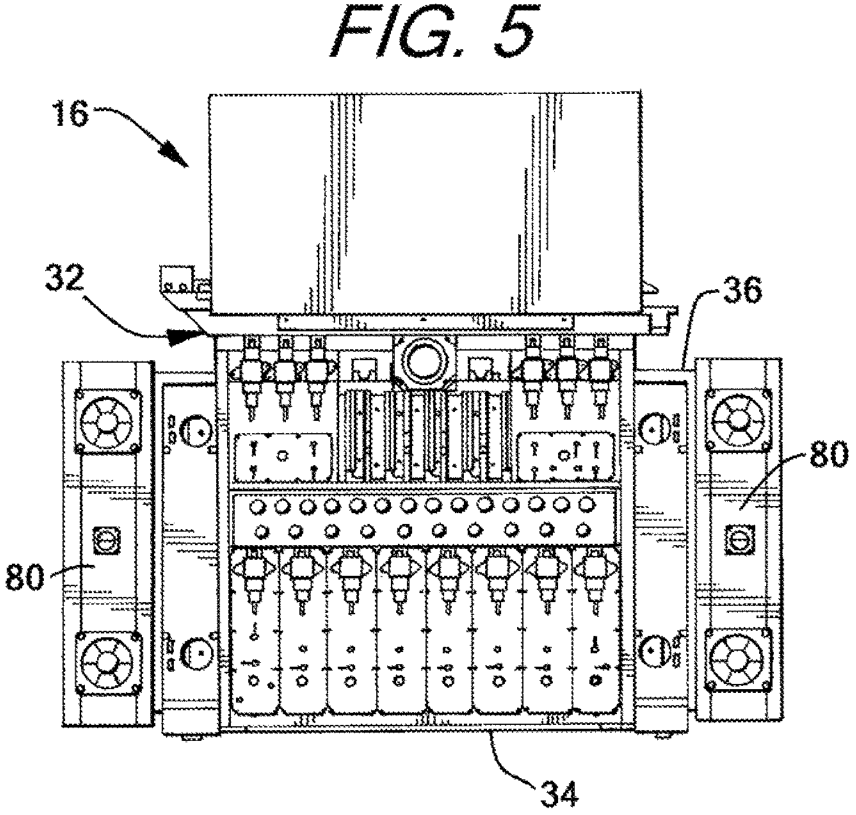
FIG. 6
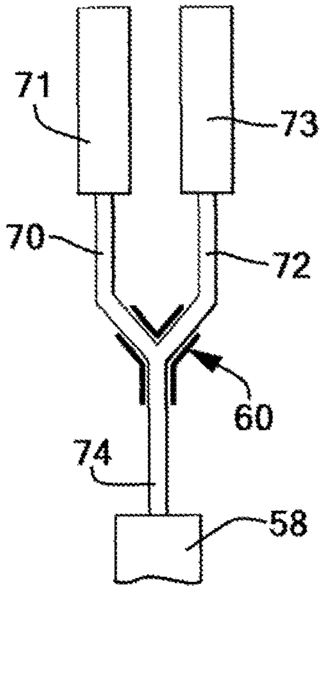

DIGITAL-TO-GARMENT INKJET PRINTING MACHINE

CROSS-REFERENCE TO RELATED APPLICATIONS

The present invention is a continuation of U.S. patent application Ser. No. 17/360,752, filed Jun. 28, 2021, which is a continuation of and claims priority to U.S. patent application Ser. No. 16/657,744, filed Oct. 18, 2019, now U.S. Pat. No. 11,077,676, the contents of which are incorporated herein by reference and made a part hereof.

FEDERALLY SPONSORED RESEARCH OR DEVELOPMENT

N/A

FIELD OF THE INVENTION

A digital-to-garment inkjet printing machine and a method for its use is described herein.

DESCRIPTION OF THE PRIOR ART

Screen printing is an art form that is thousands of years old and involves depositing ink on a screen with a pattern thereon and squeegeeing the ink so that it passes through the screen onto the item to be screened. Screen printing is commonly used for decorating clothing such as T-shirts, pants, and other items like hand bags and totes. Boutiques which specialize in printing fanciful indicia such as ornamentation, slogans, college names, or sports team names on T-shirts and other clothing are commonly seen in shopping malls. The indicia available at these boutiques can be pre-printed on a substrate and applied to articles of clothing purchased by the consumer with a heated press by boutique operators, or can be applied directly to an article of clothing. The indicia can include either simple one-color block letters or elaborate multi-color illustrations.

One alternative to screen printing is DTG (direct to garment) digital printers with piezo heads, or digital inkjet printing. These DTG machines have the advantage of being able to separate the colors from a digital file loaded onto a computer controller of the machine, and then simply spray the colors onto the garment through piezo heads. The limitation is that the piezo heads can be extremely slow when compared to screen printing, so it has not been economical to use DTG printing machines for large run garment jobs, nor to mix digital printers in with a screen printing machines because it slows the screen printing press down by about a factor of one-half to two thirds.

Also, most garment prints require an under base, which is generally white or very light. Getting enough white pigment through the piezo heads to do the under base, especially on a dark garment that requires a heavy coat, has been and is still very difficult. This has further delayed the wide-spread use of digital printing of textiles.

Inkjet print heads are subject to clogging when ink dries while inside the machine. This occurrence of clogs is known to increase as inks are made to dry quickly to increase the output of the inkjet print head. Using slow drying inks increases the drying and curing time of the ink when applied to a textile thereby decreasing the output of the inkjet print head. Using slow drying inks increases the likelihood that a color ink will bleed into a white ink layer blurring the desired image and reducing its resolution leading to a less desirable end product.

The present invention provides methods and machines for overcoming the problems encountered using slow drying inks in a direct-to-garment inkjet printing machine.

SUMMARY OF THE INVENTION

Disclosed is a carriage for a direct to garment inkjet printing machine. The machine has a frame having a leading edge, a trailing edge, and a pair of opposed lateral edges. A first row of slots is positioned on the leading edge and a second row of slots is positioned on the trailing edge. The second row of slots are spaced from the first row of slots by a gelling gap. Each slot of the first row of slots and the second row of slots has a print head board receiving area and a print head receiving area spaced from the print head board receiving area. A shelf on the frame supports tanks of white ink and tanks of color ink and a first plurality of tubing connects a tank of white ink positioned on the shelf with a print head in the first row of slots. A second plurality of tubing is for connecting a tank of color ink positioned on the shelf with a print head in the second row of slots. A pair of side heaters attached to opposed lateral edges of the first frame.

Also disclosed is a method of inkjet printing an image on a textile. The method includes: (1) providing a frame having a leading edge, a trailing edge, and a pair of opposed lateral edges, a first row of slots is positioned on the leading edge and a second row of slots is positioned on the trailing edge, the second row of slots being spaced from the first row of slots by a gelling gap, each slot of the first row of slots and each slot of the second row of slots has a print head board receiving area and a print head receiving area spaced from the print head board receiving area; (2) providing a shelf on the frame for supporting tanks of white ink and tanks of color ink; (3) providing a first plurality of tubing for connecting a tank of white ink positioned on the shelf with a print head in the first row of slots; (4) providing a second plurality of tubing for connecting a tank of color ink positioned on the shelf with a print head in the second row of slots; (5) providing a pair of side heaters attached to opposed lateral edges of the frame; (6) moving the frame across a printing area in a first printing pass along a first line and depositing a rectangular band of white ink on a textile in the printing area while exposing the white ink to gelling conditions with the pair of side heaters, the band having a height and a length; (7) indexing the frame inwardly of the printing area along a second line transverse to the first line by an incremental distance less than the height of the rectangular band; (8) moving the frame across the printing area in a second printing pass along the first line depositing a second rectangular band of white ink to overlap a portion of the first printing pass of white ink and to add to the height dimension of the white ink; (9) exposing the white ink to gelling conditions during the second printing pass; (10) repeating the steps of printing white ink on the textile and indexing the frame along the image height dimension until the height of the white ink is equal to the gelling gap; (11) moving the frame across the printing area printing with the print head in the second row of slots a first line of color ink on top of the white ink while simultaneously printing a band of white ink with the print head in the first row of slots on the textile in a location ahead of the color ink; and (12) repeating the steps of printing white ink and color ink until the image is complete.

BRIEF DESCRIPTION OF THE DRAWINGS

To understand the present invention, it will now be described by way of example, with reference to the accompanying drawings and attachments in which:

FIG. 4 is a side elevational view of the DTG inkjet printing machine of FIG. 2.

FIG. 5 is a top plan view of the DTG inkjet printing machine of FIG. 2.

FIG. 6 is a schematic representation of a plurality of tubes connecting two tanks of inks through a junction connector to a print head.

DETAILED DESCRIPTION

Figure 1A:
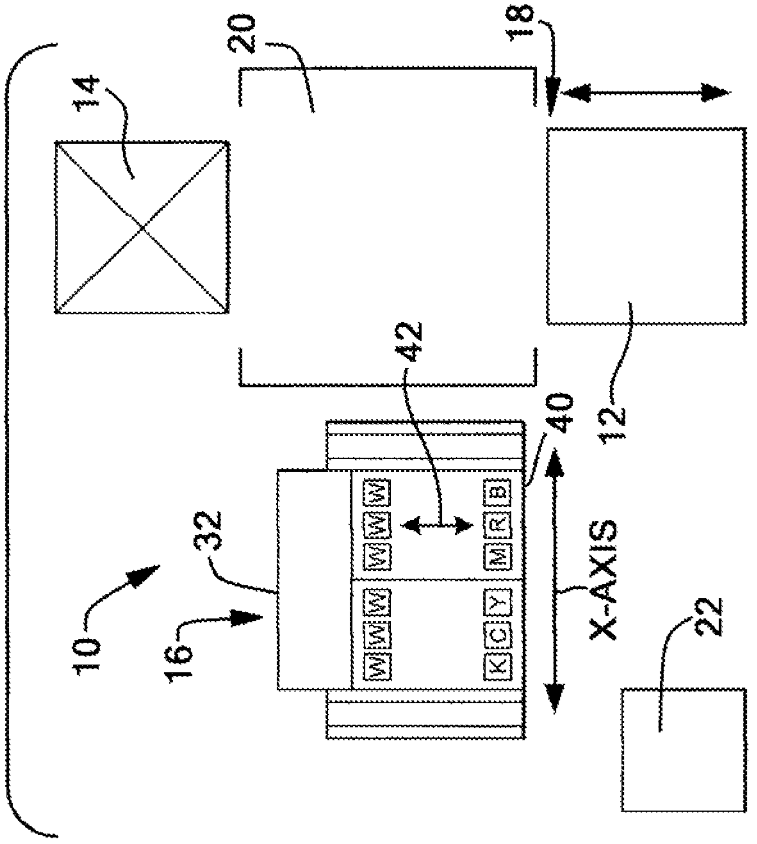
FIGS. 1A-H are a series of diagrams representing machinery in operation through numerous steps to pretreat a textile for a direct-to-garment (DTG) inkjet printing procedure.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIGS. 1A-H show, in a series of diagrams, machinery and steps in an inkjet printing operation. FIG. 1A shows a portion of an inkjet printing machine 10 having a pallet 12, a heating press 14, and an inkjet carriage 16. The pallet 12 is mounted for reciprocal translational movement from a loading area 18, through a printing area 20, to the heat press 14 and back the opposite way. The pallet is moved by a conveyor in response to signals generated by a controller 22. The pallet is dimensioned to receive and support a textile or garment or other item and is generally polygonal in shape, preferably square or rectangular. However, the shape of the pallet can be of different shapes other than polygons without departing from the scope of the present invention.

The heating press 14 applies heat to the pallet and a textile on the pallet to preheat the textile. Thus, the heating press 14 may sometimes be referred to as the heating station 14. The heating station 14 increases the temperature of the textile using a thermal heat source or an inductive heat source. The thermal heat source can be a contact heat source of a thermal radiator. Inductive heat sources cause an optional pretreatment solution to heat upon exposure to electromagnetic radiation including an ultra violet light (UV) source, an infrared (IR) light source, a visible light source, a microwave source, a radio wave source, and combinations of the same. In a preferred form of the invention, the heating press 14 is a contact heat source such as a heat sink. Pretreatment solutions are well known in the art and preferably speed the drying of the white ink.

In a preferred form of the heating station 14, the heating press 14 is a contact heat source which sometimes will be referred to as a heat sink. The heating press 14 is mounted for reciprocal translational motion from a stowed position to an operating position. Preferably, when in the stowed position it is outside of the heating station 14 such as adjacent to the heating station but not sufficiently close to heat the pallet as desired. In one form of the invention, the heating press is mounted for movement transverse to the direction the pallet is moved and more preferably along a vertical axis drawn perpendicular to a surface of the pallet which extends horizontally. Heat can be generated in the heat sink through passing current through an electrically resistive material to heat the resistive material.

The carriage 16 is shown in greater detail in FIGS. 2-10. The carriage 16 has a frame 30 having a leading edge 32, a trailing edge 34 and a pair of opposed lateral edges 36. A first row of slots 38 is positioned on the leading edge 32 and a second row of slots 40 is positioned on the trailing edge 34. The second row of slots 40 is spaced from the first row of slots 38 by a gelling gap 42, each slot of the first row of slots and the second row of slots has a print head board receiving area 44 and a print head receiving area 46 spaced from the print head board receiving area 44. In a preferred form of the invention there are 6 slots in the first row and six slots in the second row. The slots of the first row are for printing white ink and the slots in the second row are for printing color ink. Preferably, all 6 slots are occupied by print heads including 6 white print heads in the first row and 6 color print heads in the second row. Each color print head is of a different color. Color inks can be substractive types: cyan, magenta, yellow, and black (CMYK), additive types: red, green and blue (RGB), and combinations of substractive types and additive types. A shelf 48 on the frame 30 has a planar surface for supporting tanks 52 of white ink and tanks of color ink. Tubing connects a tank 52 with a print head in fluid flow communication. The tanks 52 can be equipped with stirring mechanisms to keep the components of the ink properly mixed.

In one preferred form of the invention shown in FIG. 6, a plurality of tubing segments 56 connect two tanks of ink 52 with a print head 58 through a Y-shaped junction 60. A first plurality of tubing connects two tanks of white ink positioned on the shelf with a print head 62 in the first row of slots. Preferably, a first segment of tubing 70 connecting a first tank 71 to a first arm of the Y-shaped junction and a second segment of tubing 72 connecting a second tank 73 to a second arm of the Y-shaped junction 60. Preferably these two tubing segments are of equal length. A third tubing segment 74 connects the third arm of the Y-shaped junction 60 to the print head 58.

A second plurality of tubing 56 connects tanks 52 of color ink with a print head 62 in the second row of slots. It should be understood that using a plurality of tubing segments is optional and could be replaced by a single tubing segment connecting a single tank of ink with a print head. However, it is believed a single segment of tubing is not as effective as a plurality of tubing in this application.

Figure 11:
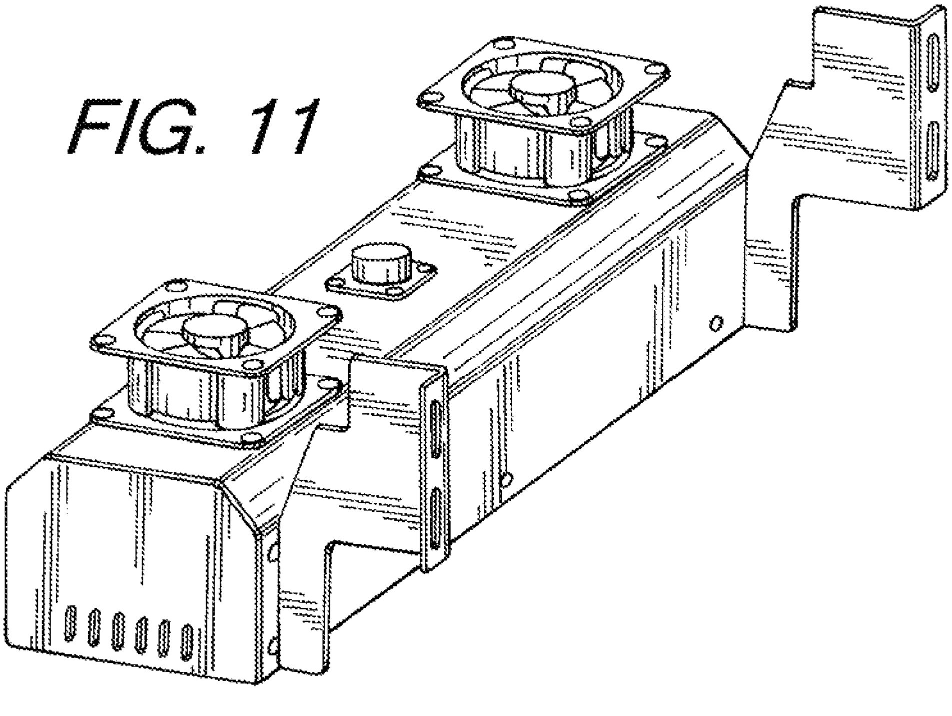
FIGS. 11-13 are various view of a side heater.

The carriage 16 also has a pair of side heaters 80 (see also FIGS. 11-13) attached to opposed lateral edges of the frame.

The side heaters 80 create a gelling condition for white ink. The side heaters can be a thermal heat source of an inductive heat source as defined above for the heating station 14. In a preferred form of the invention, the side heaters are an inductive heat source and more preferably an IR source and most preferably an IR quartz lamp. The IR quartz lamp has a tubular bulb 82 with a tungsten filament and ceramic end connectors and will emit radiation in a range of wavelengths of 780 nm to 1 mm and more preferably, medium wave infrared energy of 1.5-8 μm.

The quartz lamps 80 have a generally rectangular frame 84 defining a chamber 86 with electrical connectors 88 at opposed ends for mounting and supplying electricity to the bulb 82 from a source not shown. A pair of inwardly sloping walls 90 are provided to act as reflectors to focus the IR radiation. The sloping walls 90 each have a plurality of vents 92 cut through the thickness of the wall and are spaced from one another along a line. On a top surface 94 of the frame 84 there is a pair of upstanding fans 96 at opposed ends of the top surface and a centrally located electrical connector 98 is disposed between the air intakes 96. A pair of arms 99 are provided for connecting the IR quartz lamp to the carriage frame.

Suitable conveyor systems for moving the pallet from the loading zone to the heating station includes a screw conveyor, a linear conveyor, and other conveying systems well known to those of ordinary skill in the art.

Figure 12:
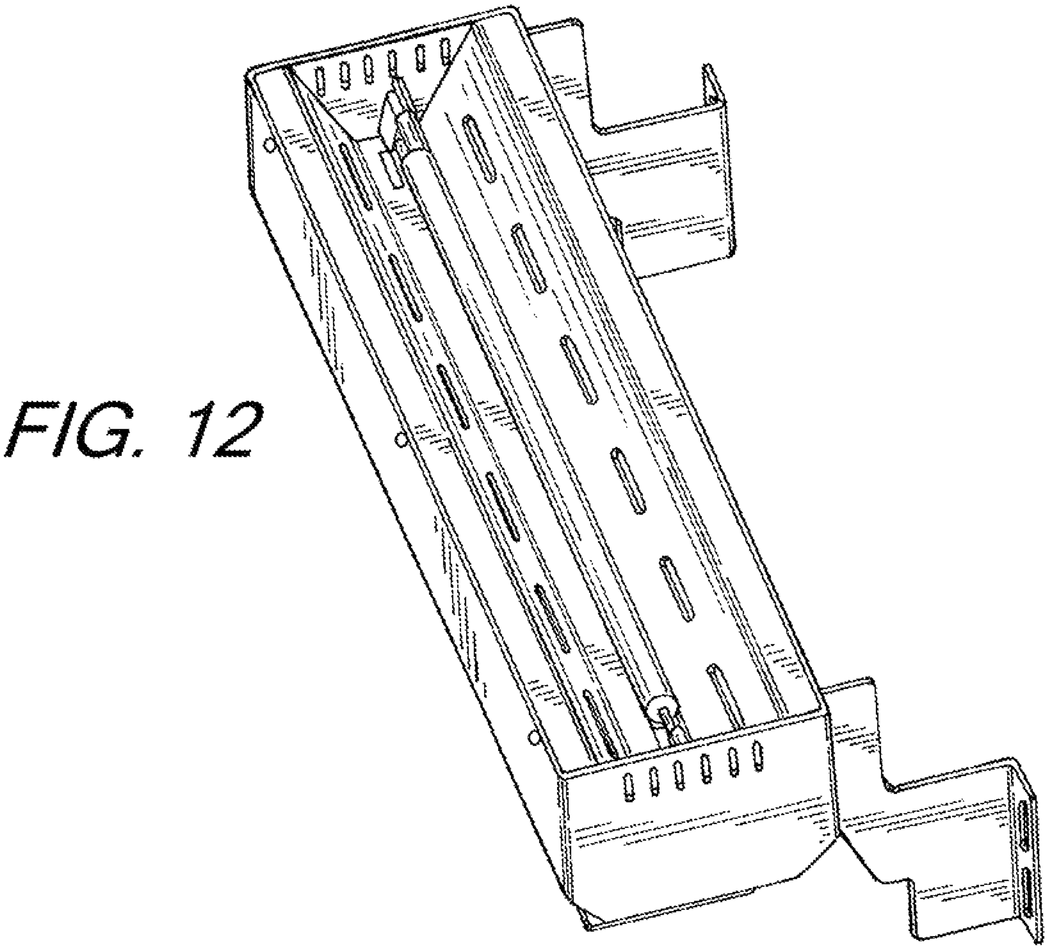
Figure 13:
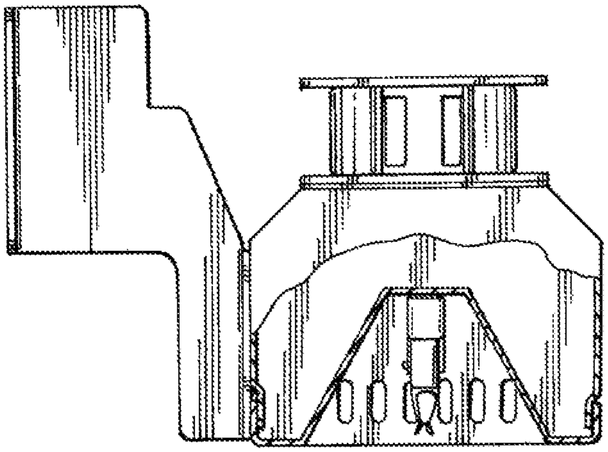

Suitable print head assemblies for inkjet printing, shown in FIGS. 12 and 13 have a print head board 44, a print head 58, and a ribbon connector 59 connecting the two. Print heads suitable for a DTG printing machine include those sold by Richoh, Brother, Fuji and numerous others well known to those in inkjet industries.

Figure 7:
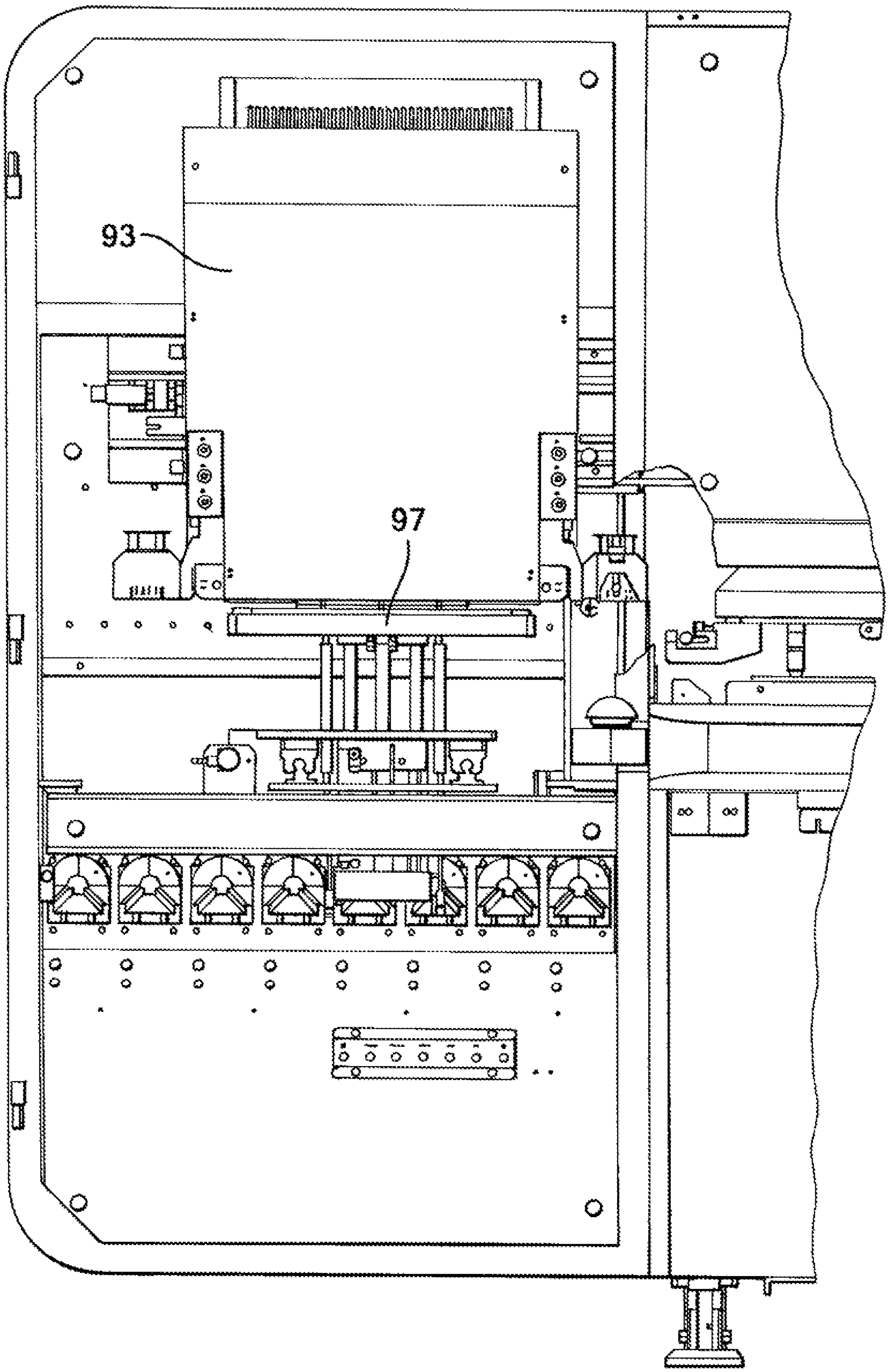
FIG. 7 is a left-side elevational view of the DTG inkjet printing machine in FIG. 4.
Figure 8:
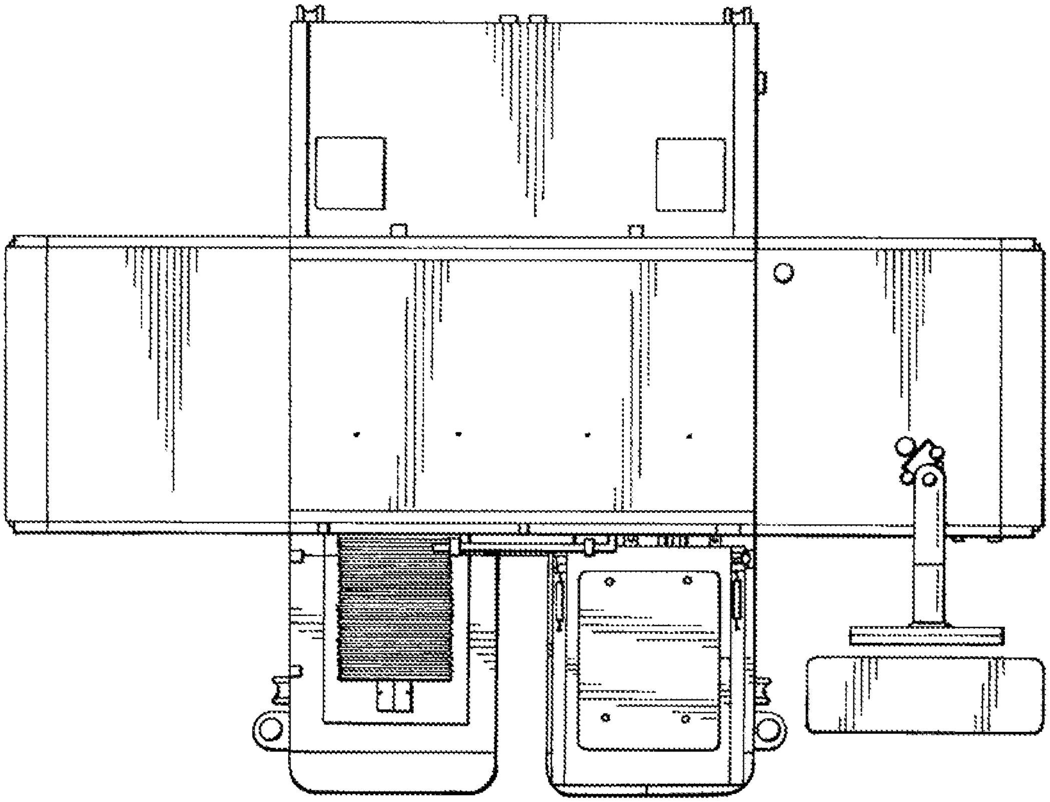
FIG. 8 is a top plan view of a DTG inkjet printing machine.
Figure 9:
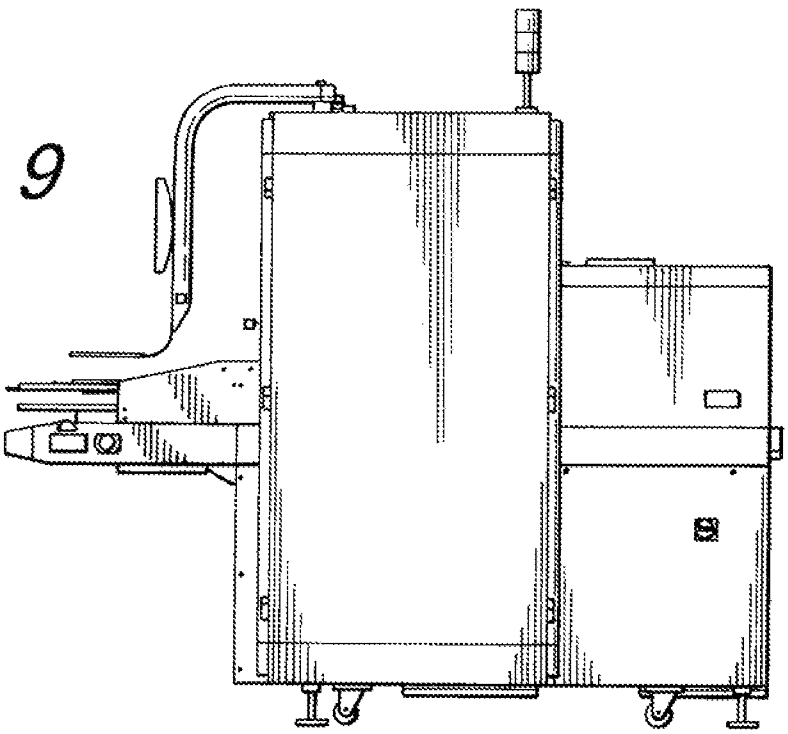
FIG. 9 is a front elevational view of a DTG inkjet printing machine.
Figure 10:
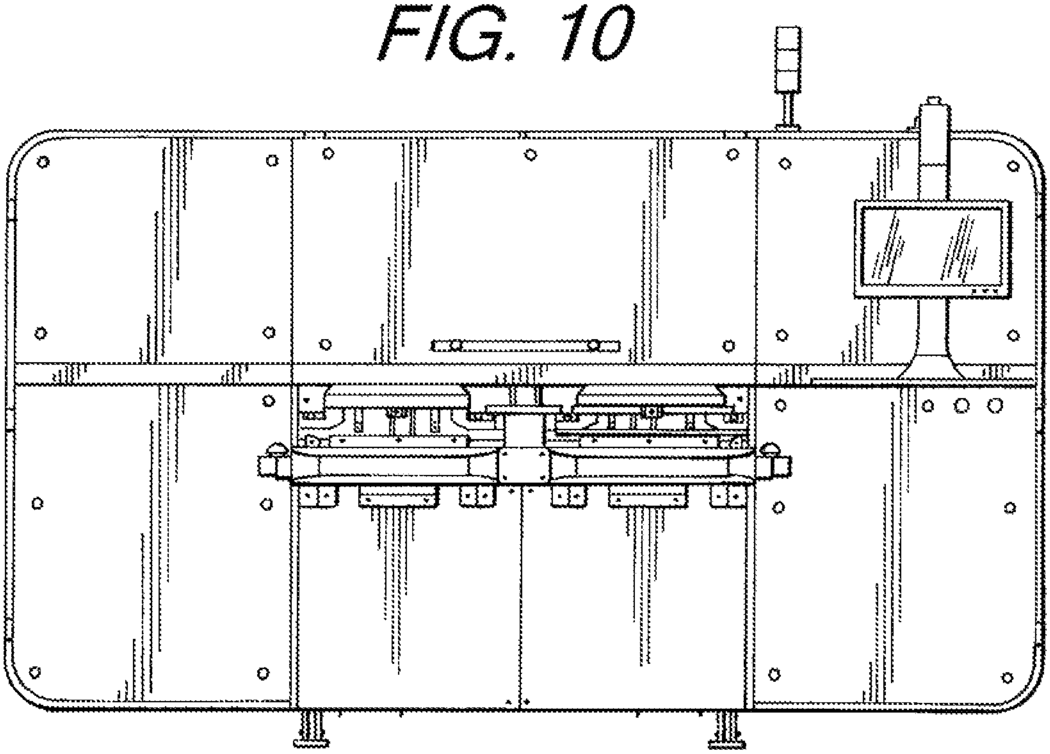
FIG. 10 is a side elevational view of a DTG inkjet printing machine.

FIG. 7 shows a portion of the carriage 16 including a humidor capping station 97 that performs three functions. First, it acts as a print head flushing station. The carriage 16 is moved into the station and a cap is moved into cooperative engagement with the print heads and a flushing fluid is used to flush out the tubing delivering the ink which is drained to a waste tank. Second, the capping station 97 also employs squeegees that reciprocatingly are drawn over the head to wipe a faceplate of the print head. Third, the capping station 97 serves as a park station as the print head is positioned here when not in use. The capping station seals the print head to prevent it from drying out.

Figure 1B:
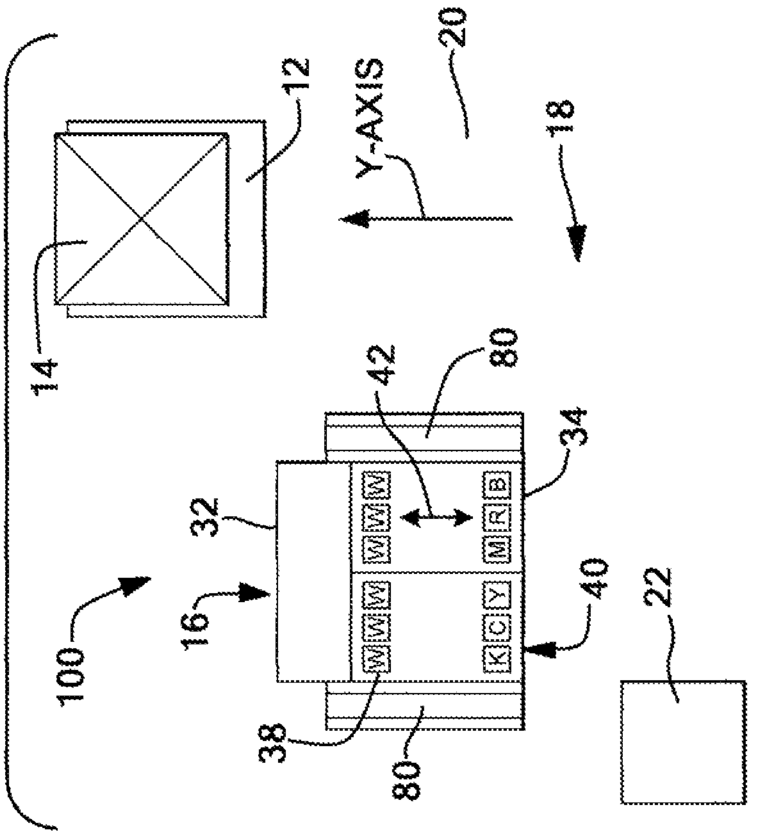

Now will be described how the machinery described is used to preheat a textile and pallet prior to an inkjet printing procedure. A textile is mounted on the pallet in the loading area (FIG. 1A) and is then moved by a conveyor into the heating station 14 as shown in FIG. 1B. The heating station 14 preheats the textile to a temperature suitable for the nature and physical properties of the textile being printed on. Throughput speed is also important so it is desirable to use as high temperature as possible, without scorching or otherwise damaging the textile, to impart as much thermal energy to the textile. The temperature range will typically be between 100° F. to 400° F. For blended textiles containing synthetic fibers, the temperature of the heating station and or the time period in the station to avoid dye migration. The heating station also acts like and iron by pressing down erratic shirt fibers to provide a flat, regular surface. The desired temperature range or threshold temperature can be entered into the controller 22 using a graphical user interface and a data entry device such as a keyboard or keypad. Temperature sensors (not shown) measure the temperature of the textile and generate a signal representative of the temperature to the controller. It is contemplated using other physical properties instead of temperature or in addition to temperature to determine whether the textile is in proper condition for receiving ink from an inkjet print head. These properties include the time period inside the heating station, the moisture content of a surface of the textile, the electrical conductivity of the textile, the electrical resistivity of the textile, the capacitance of the textile, the reflectance of the textile. Threshold values for any of these physical properties can be entered into the controller in the same fashion as the temperature threshold. Suitable sensors of these additional physical properties will be positioned in a suitable location or in suitable locations and will be capable of generating a signal representative of the physical property to the controller 22. The controller will compare the actual values with the threshold value to determine if the textile is ready for printing.

Figure 1D:
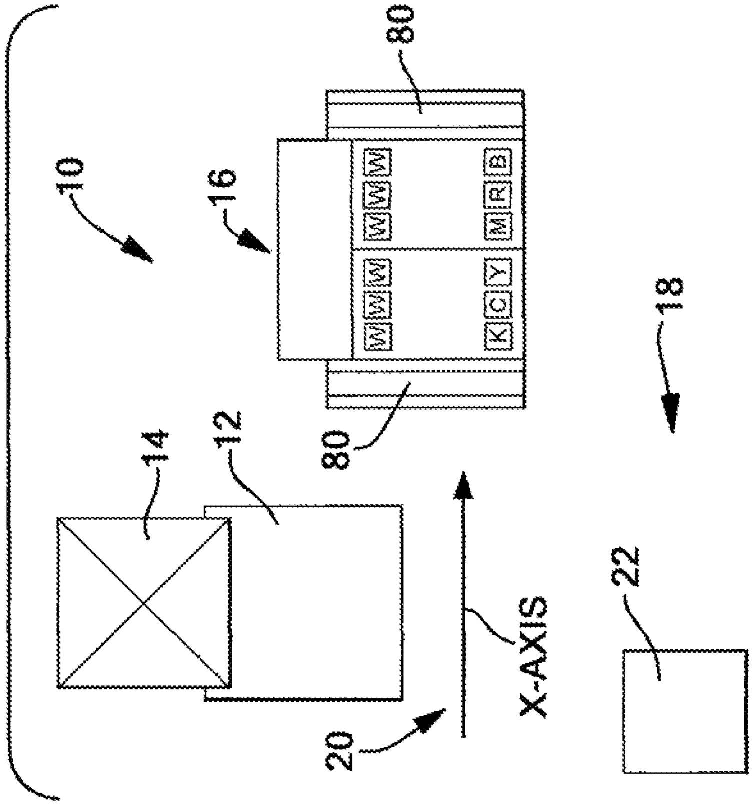
Figure 1C:
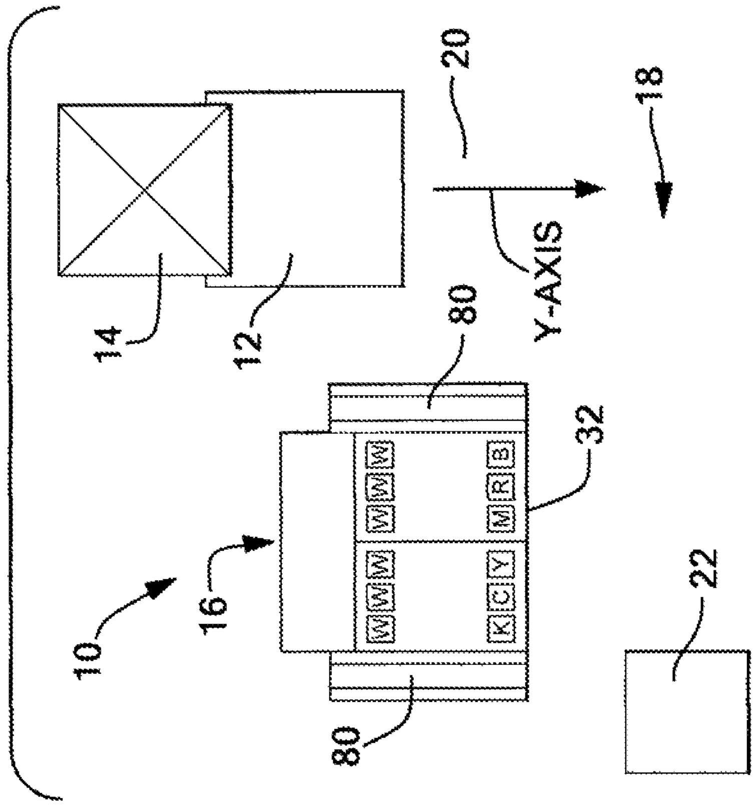
Figure 1F:
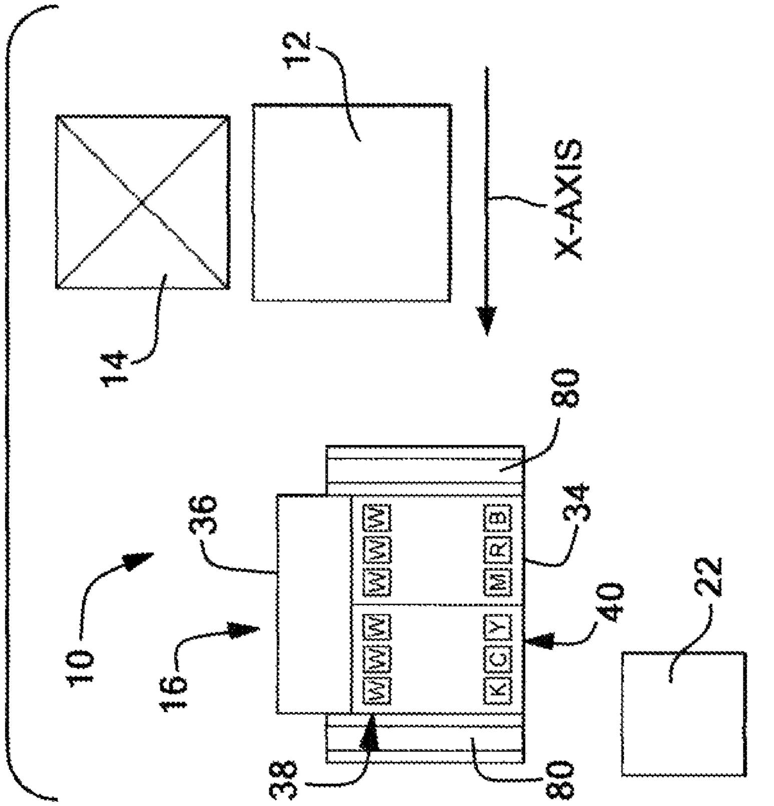

After the textile is determined by the controller to be in a condition for printing, it is moved by the conveyor, in response to a signal received from the controller, away from the heating station 14 into the printing area as shown in FIG. 1C. The carriage 16 is then moved by a conveyor along a line transverse to the movement of the pallet into the printing area where white ink is applied to the textile. White ink is typically applied to the textile in all areas underlying the desired image to be printed thereover.

Figure 1E:
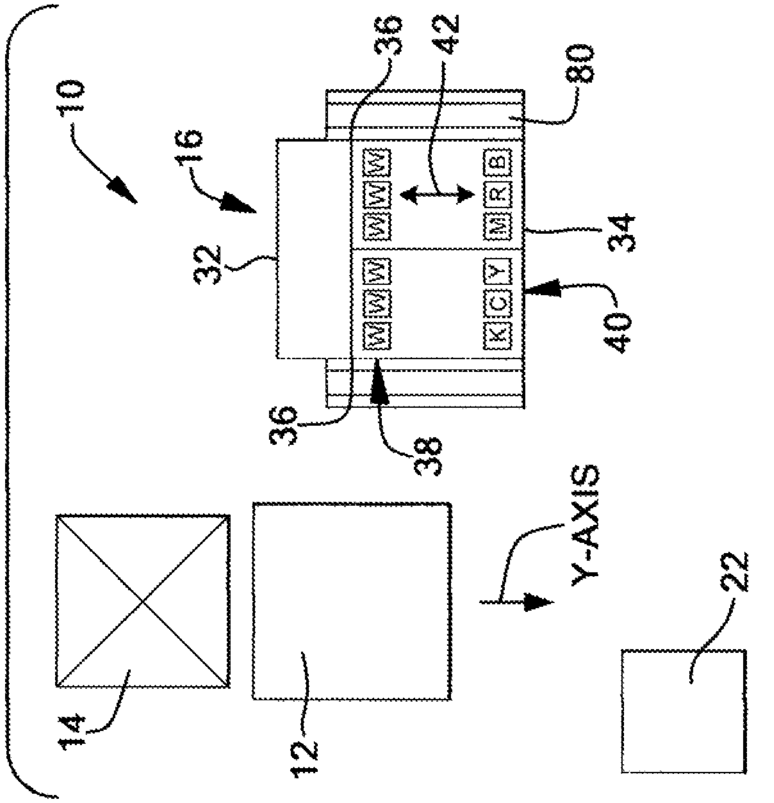
Figure 1H:
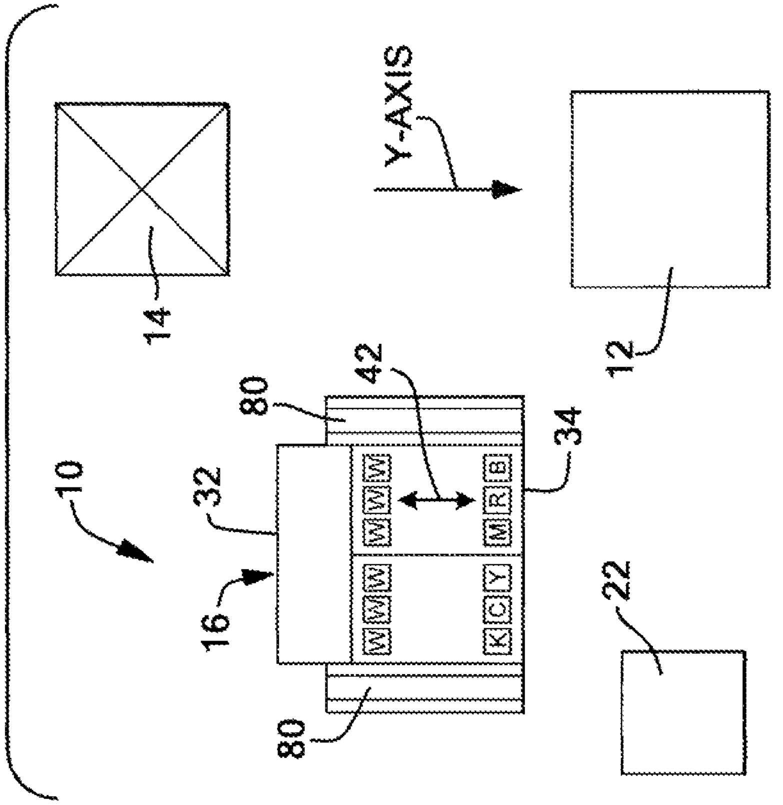

During each printing pass, the white ink is applied by the white print head in the shape of a rectangular band having a print height and a print length determined by the size of the print head. The print height typically is small in comparison to the image height so numerous print passes must be taken as shown in FIGS. 1E,F to incrementally build up or cumulate the image height. Each print pass, except the first, will overlap a portion of the immediately prior pass. Preferably, the overlap can be expressed as a percentage of a maximum printing height of the print head. Preferably, the amount of overlap is from 75% to 1% of the maximum printing height, more preferably from 50% to 10% and most preferably from 40% to 15%.

The desired image will have an image height dimension and an image length dimension that are orthogonally disposed with respect to one another. The desired image can be oriented on a textile or garment such as a T-shirt in a printing area that covers from an entire side of a T-shirt including the sleeves to a smaller fraction of the T-shirt such as a portion of a body of the T-shirt. In one example of image orientation, a top of the image is disposed below a neck hole of the T-shirt and a bottom of the image is positioned somewhere just above a body opening of the T-shirt. The lateral edges are disposed along a line drawn from a junction between the sleeves and the body of the T-shot vertically to the body opening. A printing direction typically will proceed along the length dimension with a printing pass defined by any number of trips from one lateral edge to the opposed lateral edge. For example, for each 1-5 full-length printing passes, the print head is moved along the height dimension by a prescribed amount. The printing typical proceeds from the bottom of the image toward the top of the image or vice versa. The white ink and the color ink area will cumulate until the cumulated print height of the white ink and the cumulated print height of color ink is equal to or greater than the desired image height. More preferably, the cumulated print height will equal to the image height and will not exceed the image height. At this point the inkjet printing is completed and the inkjets stop depositing ink.

Typically the prescribed amount the print head is moved along the image height dimension is on the order of from 0.1 inch to 2 inch, more preferably from 0.2 inch to 1 inch, and most preferably 0.3 inch to 0.75 inch. A servo motor or servo motors drive the carriage along two perpendicular axes in accordance with instructions received from the controller 22. A Y-axis corresponds to the height dimension of the image and an X axis corresponds to the image length dimension. The controller 22 instructs the X-axis server motor drive controller to move the carriage 16 a calculated distance along the X-axis and is provided encoder position feedback and moves status inputs from the X-axis servo drive controller. When the X-axis drive controller indicates the desired move is finished, the controller 22 instructs a Y-axis servo drive controller to move the print head a calculated distance along the Y-axis. The controller 22 is provided with encoder position feedback and move status inputs from they-axis servo controller until the movement along the Y-axis is complete. The process then repeats until the print job is complete.

In a first printing pass shown in FIG. 1D, the side heaters create gelling conditions by conductively or inductively heating the white ink to speed the drying of the white ink to prepare it to accept color ink. Preferably the white layer is applied to achieve a constant color texture and is uniform across the entire printing area and forms an opaque masking layer.

Figure 1G:
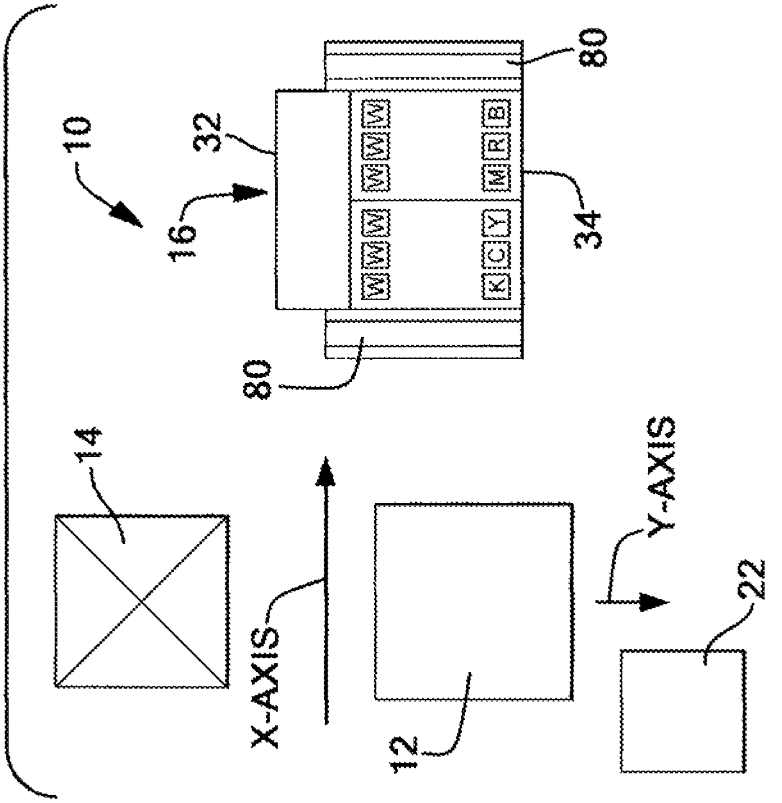
Figure 3:
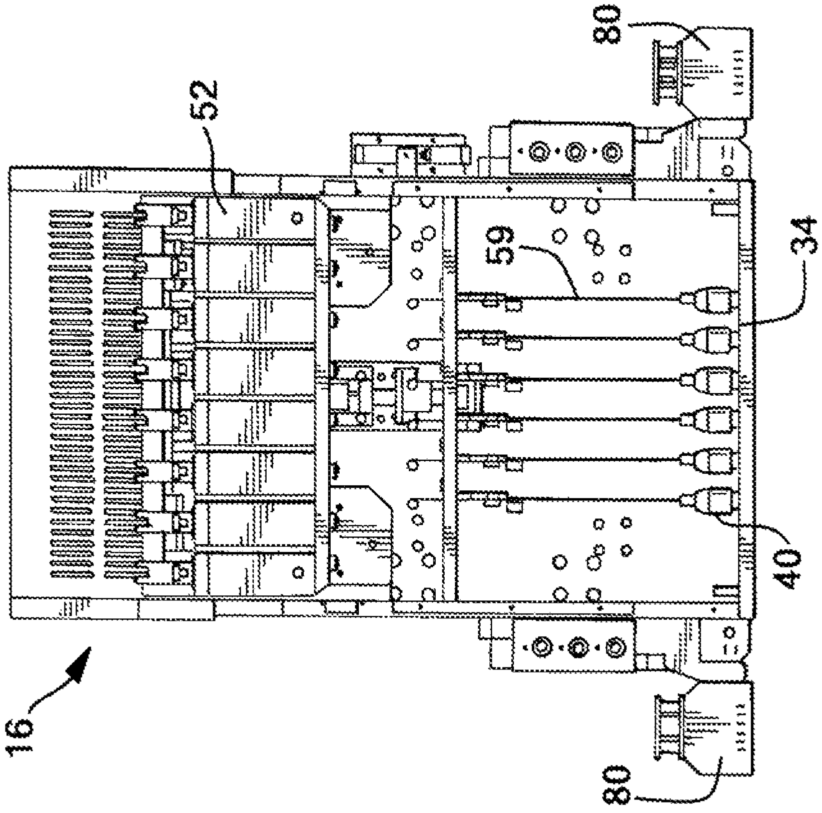
FIG. 3 is a rear view of the DTG inkjet printing machine of FIG. 2.
Figure 2:
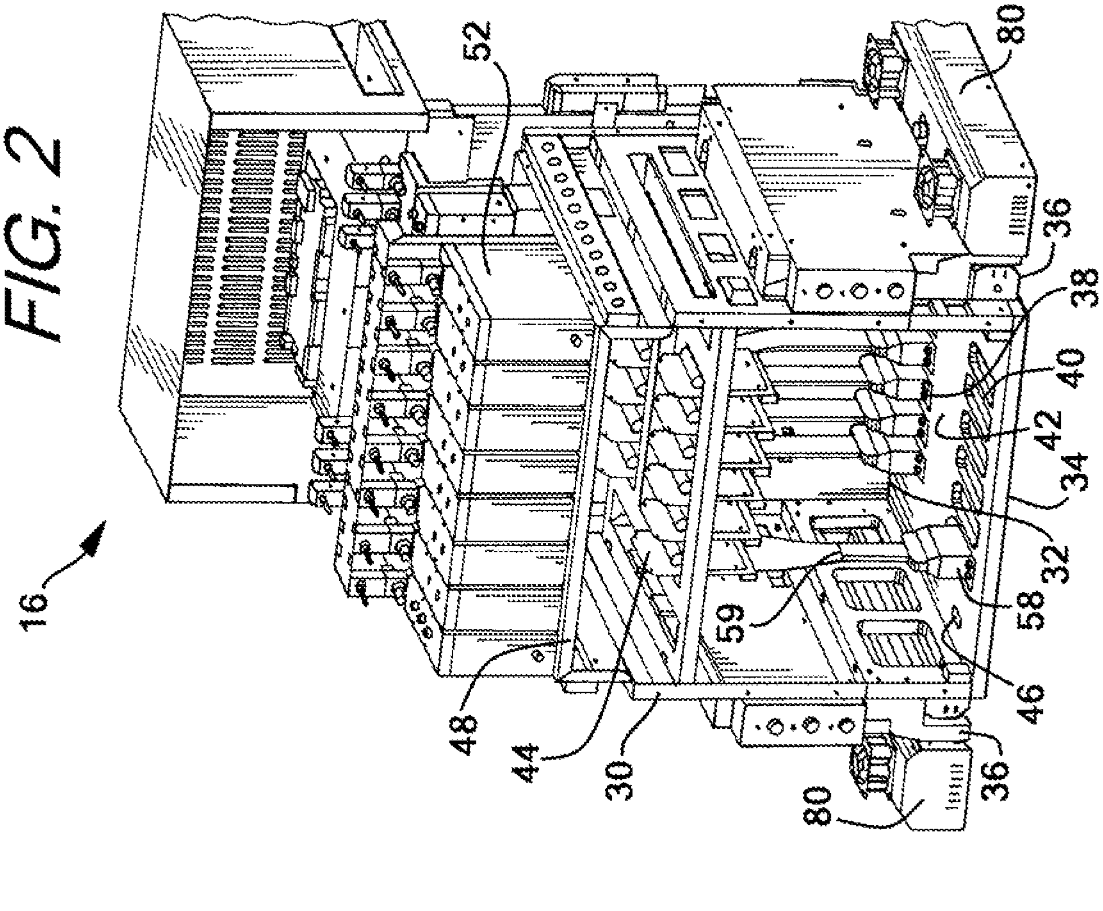
FIG. 2 is a perspective view of a carriage for a DTG inkjet printing machine.

Only white ink is printed on the textile until the height of the cumulating white image equals the gelling gap 42. At this point the color inkjets in the second row come into alignment with the white ink of the first pass. Color ink is applied over the gelled (or gelling) white ink as is shown in FIGS. 1G,H. White ink continues to be simultaneously applied to the textile on the leading edge ahead of the color ink by the gap distance. The white ink stops being printed when it reaches the image height, but the side heaters continue to create gelling conditions until the color ink printing height is equal to or greater than the image height. At this point the inkjet printing process is complete and the pallet returns to the position shown in FIG. 1A. A user removes the finished textile from the pallet and a fresh pretreated textile is loaded in its place. This process is repeated numerous times until the print job is completed, which can be a single textile, tens of textiles, hundreds of textiles, thousands of textiles, tens of thousands of textiles and so on. By continuously heating and drying the white ink while depositing color ink on top results in a printed garment lower in moisture that can be fully dried and the ink cured in a subsequent drying step, for example using a drying oven, in one third of the time required for a garment printed in a wet-on-wet process.

What is meant by gelling of the white ink is the ink is partially dried to a point where it is almost dry to the touch so that is accepts color ink printed on top thereof without that the color ink bleeding into the white ink layer. The gelling of the white ink is also enhanced through its interaction with the pretreatment solution. An ink is fully cured when the moisture has been fully evaporated and the textile or garment is ready for washing or wearing.

Suitable white inkjet inks and suitable color inks are of the type that are jettable through a piezoelectric print head. Suitable inks include be aqueous-based inks, heat-curable inks, plastisol inks, solvent inks, and UV curable inks to name a few examples.

Suitable color inkjet inks are available in subtractive colors: cyan, magenta, yellow, and black (CMYK), and additive colors: red, green and blue (RGB).

Figure 14:
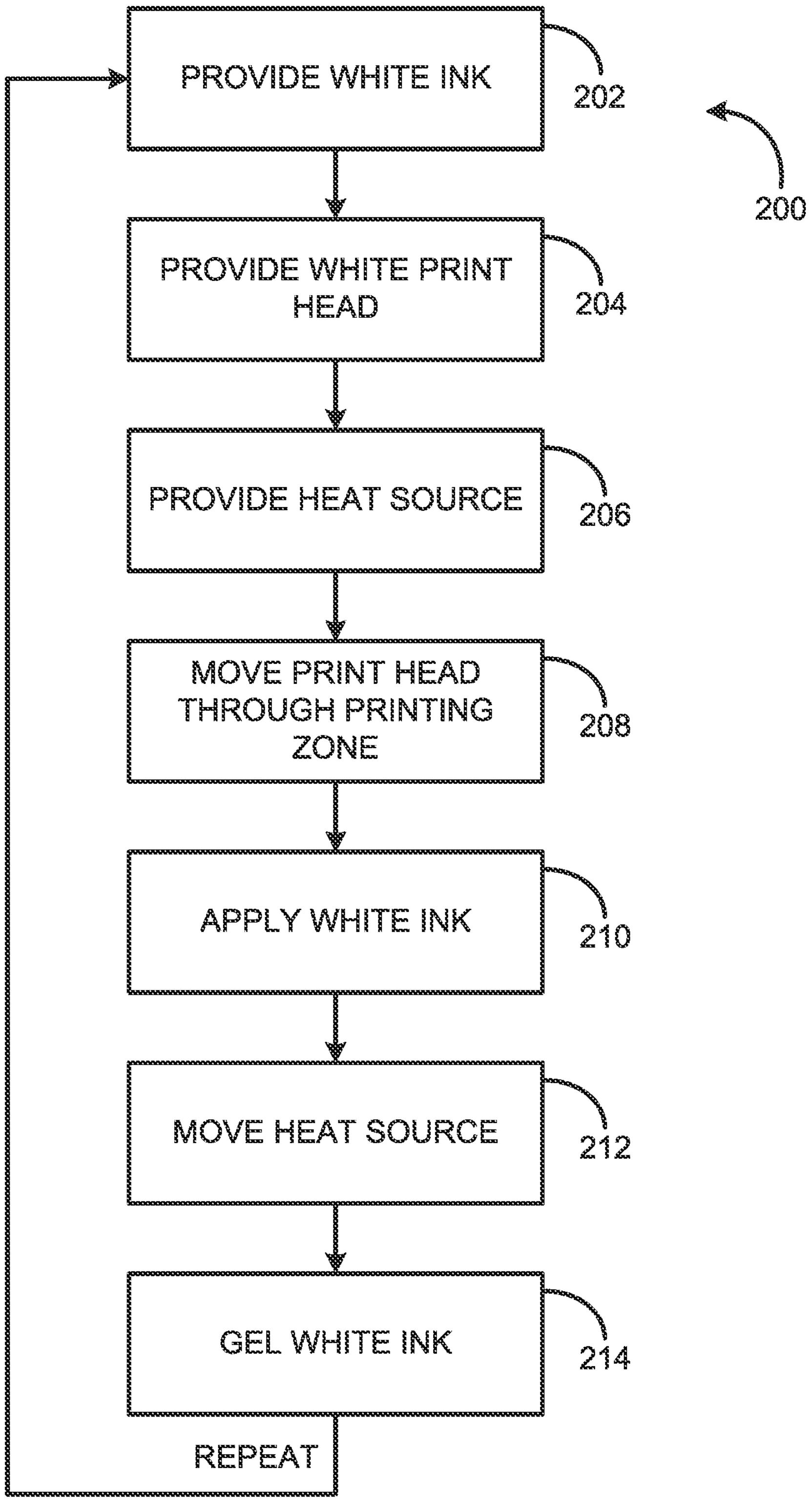
FIG. 14 is a flow chart of a method of printing white ink on a textile in an inkjet printing operation.

FIG. 14 shows a method 200 for printing white ink on a preheated textile. The method 200 includes the step of providing a source of white ink 202, providing a print head connected to the source of white ink and mounted for reciprocating translational movement through a printing zone 204, providing a heating source 206, moving the first print head through the printing zone 208 to apply white ink 210 to a textile positioned in the printing zone, and moving the heating source 212 through the printing zone to heat the white ink on the substrate to cause gelling 214 of the white ink.

Figure 15:
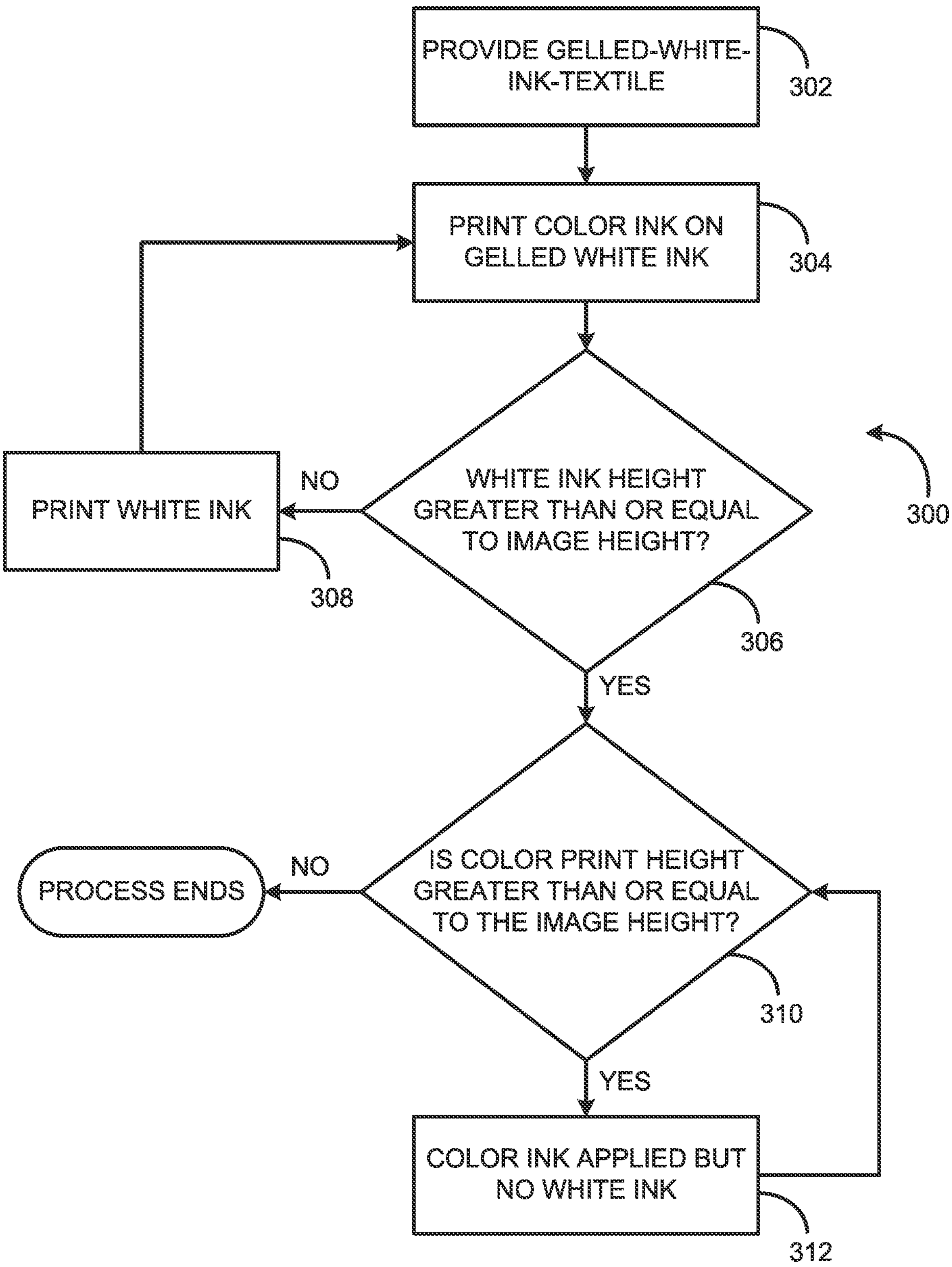
FIG. 15 is a flow chart of a method of printing color ink on top of white ink in an inkjet printing operation.

The resulting gelled-white-ink-textile prepared in the method of FIG. 14 is printed on with color ink in a process 300 of FIG. 15. The first step is to provide the gelled-white-ink-textile 302 and then to print color ink on the gelled white ink 304. The height of the white ink is compared by the controller in step 306 to the image height and if it is less than then the method follows the No arrow to step 308 where white ink is printed simultaneously from the leading edge while the color ink is printed on the trailing edge. If the white ink height is equal to or greater than the image height than the method follows the direction of the Yes arrow to step 310 where the color print height is compared with the image height. If the color print height is less than the image height then the method follows the direction of the Yes arrow to step 312 where color ink is applied but white ink is not applied. Preferably, in step 314 the side heaters continue to create gelling conditions of the white ink. If the color print height is equal to or greater than image height the method follows the direction of the No arrow to step 316 where the printing process is completed and all printing stops.

Many modifications and variations of the present invention are possible in light of the above teachings. It is, therefore, to be understood within the scope of the appended claims the invention may be protected otherwise than as specifically described.

We claim:

1. A direct to garment inkjet printing system comprising:
- a pallet;
- a loading area;
- a heating press and heating station;
- a printing area;
- an inkjet carriage including:
- a frame having a bottom wall, a leading edge, and a trailing edge;
- a first plurality of slots in a row on the bottom wall proximate the leading edge of the frame;
- a second plurality of slots in a row on the bottom wall proximate the trailing edge of the frame and spaced from the first plurality of slots by a gelling gap greater than a print head;
- a first plurality of print heads in the first plurality of slots in the frame, each of the first plurality of print heads coupled to at least one tank of under base ink;
- a second plurality of print heads in the second plurality of slots in the frame, each of the second plurality of print heads coupled to at least one tank of color ink wherein the frame does not include operable print heads in the gelling gap; and
- a shelf on the frame positioned above the first plurality of print heads and the second plurality of print heads in the frame supporting at least a first tank of under base ink and at least a first tank of color ink having an ink having a first color different than the under base ink; and
- the pallet and the inkjet carriage operably coupled to a conveyor wherein the conveyor is configured to translate the pallet between loading area, the heating station, and the printing area and translate the carriage to and away from the printing area.

2. The direct to garment inkjet printing system of claim 1 wherein the conveyor is moved in response to signals generated by a controller.

3. The direct to garment inkjet printing system of claim 1 wherein the pallet is dimensioned and shaped to receive and support a textile or garment.

4. The direct to garment inkjet printing system of claim 1 wherein when the pallet is translated to the heating station, the heating press applies heat to the pallet and a textile or garment mounted to the pallet.

5. The direct to garment inkjet printing system of claim 4 wherein the heating station uses a contact heat source of a thermal radiator or heat sink or an inductive heat source causing an optional pretreatment solution applied to the textile or garment to heat upon exposure to electromagnetic radiation including an ultra violet light (UV) source, an infrared (IR) light source, a visible light source, a microwave source, a radio wave source, and combinations of the same.

6. The direct to garment inkjet printing system of claim 5 wherein the heating press heats to a temperature range is about 100° F. to about 400° F.

7. The direct to garment inkjet printing system of claim 5 wherein the heating press is mounted for reciprocal translation motion from a stowed position to an operating position upon movement of the pallet to the heating station.

8. The direct to garment inkjet printing system of claim 7 wherein the heating press presses down erratic fibers of the textile or garment of provide a flat textile or garment surface.

9. The direct to garment inkjet printing system of claim 1 where the system further comprises a humidor capping station configured to serve as a park station for the inkjet carriage when the print heads are not in use.

10. A method of inkjet printing an image on a textile comprising:

providing a direct to garment inkjet printing system comprising a loading area, a heating press and heating station, a printing area, a pallet operably coupled to a conveyor configured to translate the pallet between the loading area, the heating station, and the printing area, an inkjet carriage operably to the conveyor configured to translate the inkjet carriage to and away from the printing area, the inkjet carriage including:

a frame having a bottom wall, a leading edge, and a trailing edge;

a first plurality of slots in a row on the bottom wall proximate the leading edge of the frame;

a second plurality of slots in a row on the bottom wall proximate the trailing edge of the frame and spaced from the first plurality of slots by a gelling gap greater than a print head;

a first plurality of print heads in the first plurality of slots in the frame, each of the first plurality of print heads coupled to at least one tank of under base ink;

a second plurality of print heads in the second plurality of slots in the frame, each of the second plurality of print heads coupled to at least one tank of color ink wherein the frame does not include operable print heads in the gelling gap; and a shelf on the frame positioned above the first plurality of print heads and the second plurality of print heads in the frame supporting at least a first tank of under base ink and at least a first tank of color ink having an ink having a first color different than the under base ink; and mounting the textile to the pallet in the loading area;

translating the pallet from loading area to the heating station;

preheating the pallet and textile at the heating station with the heating press;

translating the preheated pallet and textile to the printing area;

translating the inkjet carriage to the printing area;

moving the frame across the printing area in a first printing pass along a first line and depositing a band of under base ink on the textile in the printing area while exposing the under base ink to gelling conditions, the band having a height dimension and a length dimension;

indexing the frame inwardly of the printing area along a second line transverse to the first line by an incremental distance less than the height of the band;

moving the frame across the printing area in a second printing pass along the first line depositing a second rectangular band of under base ink to overlap a portion of the first printing pass of under base ink and to add to the height dimension of the under base ink;

exposing the under base ink to gelling conditions during the second printing pass;

repeating the steps of printing under base ink on the textile and indexing the frame along the image height dimension until the height of the under base ink is equal to the gelling gap;

moving the frame across the printing area printing with the print head in the second row of slots a first line of color ink on top of the under base ink while simultaneously printing a band of under base ink with the print head in the first row of slots on the textile in a location ahead of the color ink; and repeating the steps of printing under base ink and color ink until the image is complete.

11. The method of inkjet printing of claim 10 wherein the step of preheating the pallet and textile at the heating station with the heating press includes the step of flattening errant fibers of the textile creating a flat printable surface area.

12. The method of inkjet printing of claim 10 wherein the inkjet carriage further comprises a first heater and a second heater coupled to opposite sides of the frame and the step of exposing the under base ink to gelling conditions further comprises the step of heating the under base ink with the first heater and second heater.

13. The method of inkjet printing of claim 10 wherein the inkjet carriage further comprises a at least one servo motor to drive the inkjet carriage along two perpendicular axes in the print area and the step of moving the frame across the print area includes the step of moving the print heads along the image height dimension on the order of from 0.1 inch to 2 inches.

14. The method of inkjet printing of claim 10 moving the frame across the printing area in a second printing pass along the first line depositing a second rectangular band of under base ink to overlap a portion of the first printing pass of under base ink includes overlapping from about 75% to 1% of a maximum printing height of the print heads.

15. The method of inkjet printing of claim 10 wherein the first plurality of print heads are coupled to at least one tank of under base ink through at least a first under base ink tube and the second plurality of print heads coupled to at least one tank of color ink through at least a first color ink tube.

16. The method of inkjet printing of claim 15 wherein the inkjet system further comprises a humidor capping station.

17. The method of inkjet printing of claim 16 further including the step of cleaning the print heads comprising the steps of translating the inkjet carriage to the humidor capping station, moving a cap into cooperative engagement with the print heads, flushing fluids through the as least first under base ink tube and the at least first color ink tube into a waste tank.

18. The method of inkjet printing of claim 17 wherein the step of cleaning the print heads further comprises the step of humidor capping station employing squeegees that are reciprocatingly drawn over the printing heads to wipe a faceplate of the printing heads.

19. The method of inkjet printing of claim 16 further including the step of parking the inkjet carriage at the humidor capping station when the print heads are not in use.

20. The method of inkjet printing of claim 16 including the steps of sealing the print heads at the humidor capping station to prevent the print heads from drying out.

* * * * *